UNITED STATES PATENT OFFICE.

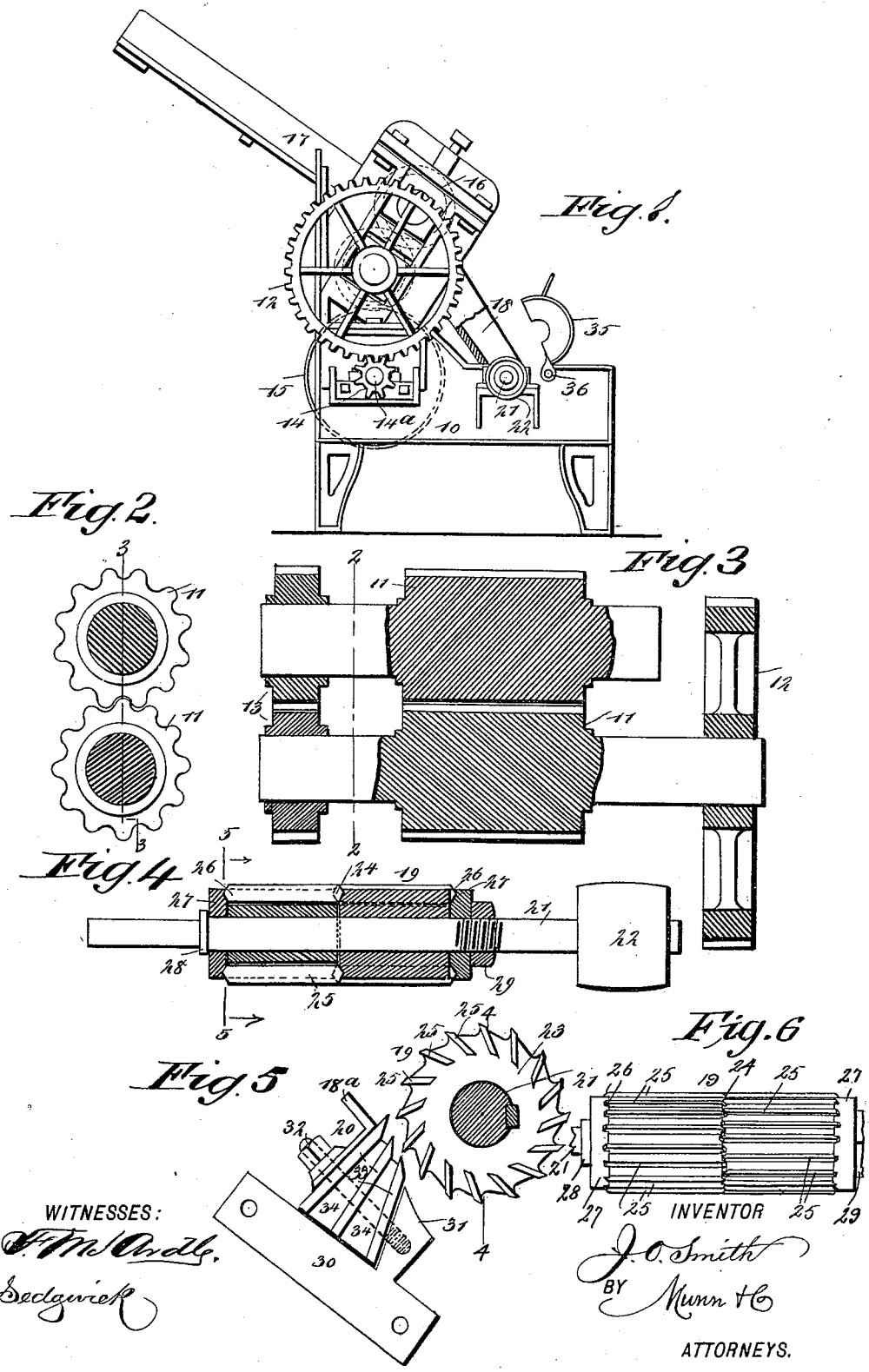

JOHN O. SMITH, OF NASHVILLE, TENNESSEE.

FEED-MILL.

SPECIFICATION forming part of Letters Patent No. 518,123, dated April 10, 1894.

Application filed May 16, 1893. Serial No. 474,382. (No model.)

*To all whom it may concern:*

Be it known that I, JOHN O. SMITH, of Nashville, in the county of Davidson and State of Tennessee, have invented a new and Improved Feed-Mill, of which the following is a full, clear, and exact description.

My invention relates to improvements in that class of feed mills which are used for grinding up different kinds of food products, such as corn, corn cobs, oil cake, and similar hard and tough substances, and the object of my invention is to produce a very simple, durable and cheap machine which may be operated with comparatively little power, and which rapidly crushes and cuts up the various kinds of feed so as to render the same available for feeding stock.

To this end my invention consists in certain features of construction and combinations of parts, which will be hereinafter described and claimed.

Reference is to be had to the accompanying drawings, forming a part of this specification, in which similar letters and figures of reference indicate corresponding parts in all the views.

Figure 1 is a broken side elevation of the machine embodying my invention. Fig. 2 is a detail cross section of the feed and crushing rolls on line 2—2 of Fig. 3. Fig. 3 is a longitudinal section of the same on line 3—3 of Fig. 2. Fig. 4 is a detail longitudinal section of the revoluble cutter on line 4—4 of Fig. 5. Fig. 5 is a detail sectional view of the stationary and revoluble cutters, the latter being shown in section on the line 5—5 of Fig. 4; and Fig. 6 is a plan view of the revoluble cutter.

The mill is provided with a suitable frame 10, in the upper portion of which are journaled the feed and crushing rolls 11, which have dull cogs which mesh together, as shown in Fig. 2, so as to crush and break up the fiber of the material which is fed between them, and one of these rolls has its shaft provided with a driving gear wheel 12, while the two rolls are geared together in the usual way by gears 13, so that they will turn in unison and in opposite directions. The driving gear 12 meshes with a pinion 14, on the driving shaft 14ª, which shaft is provided with a suitable pulley 15, or its equivalent. The upper feed and crushing roll 11 is mounted in adjustable bearings 16 of the usual kind, and the feed rolls are supplied with material from the feed chute 17, which delivers between them. The material which passes through the feed rolls drops through a spout 18, to the cutters 19 and 20, the former of which is revoluble and is carried by a shaft 21 journaled in the frame 10 and provided with a suitable driving pulley 22. The cutter 19 is formed of a cylinder 23, which is divided transversely, into two sections, *a* and *b* and knives 25, which are secured in the sections and project tangentially from the surface of the same, the knives having double edges so that if the knives become dull on one edge they may be reversed and the opposite edge used. Each section of the cylinder is provided with longitudinal grooves and with V-shaped grooves in its inner end, the longitudinal grooves of one section being opposite the end grooves of the other section, and the knives 25 of each section, which have pointed ends 26, lie in the longitudinal grooves and their pointed ends fit into the end grooves of the adjacent section and in grooves of one of the collars 27, whereby the knives of the two sections will be out of alignment and break joints with each other, as plainly shown in Figs. 4 and 6. One collar 27 fits against a rigid collar 28 on the shaft 21, while the other is jammed against the cylinder by a nut 29 on the said shaft, and by tightening the nut the collars are forced against the knives so as to hold them firmly in place, while to loosen the knives it is only necessary to loosen the nut.

The stationary cutter 20 is provided with a plurality of knives, preferably three, which project to a point adjacent to the knives 25, and which have cutting edges, as shown clearly in Fig. 5. This cutter is provided with a cutter bar 30, which is fastened firmly to the frame of the machine, and which has an upwardly-extending cross rib 31, to receive the fastening bolts 32, which project through the knives 33 of the stationary cutter and through spacer blocks 34 which are arranged between the knives, these blocks being tapered upwardly so that the edges of the knives 33 may converge, as shown in Fig. 5. The revoluble cutter of the machine is covered by a swinging hood 35, see Fig. 1, which is hinged to the main frame, as shown at 36.

The material from the spout 18 is delivered between the rotary and stationary cutters and upon a guide shelf 18ª, and the rapidly moving knives 25 carry the material past the knives 33, and at the same time chop it up finely so that it is fit for use.

It will be seen that the construction described is very simple, that there is nothing about it to get out of repair, that the knives are arranged so as to cut effectively, and that the revoluble knives may be reversed or renewed when necessary.

Having thus described my invention, I claim as new and desire to secure by Letters Patent—

1. In a feed mill, a revoluble cutter, comprising two cylindrical sections provided with longitudinal grooves and with grooves in their inner ends, knives fitting in the longitudinal grooves of the cylindrical sections, and collars having grooves on their inner faces to receive the outer ends of the knives, substantially as described.

2. In a feed mill, a revoluble cutter, comprising two cylindrical sections having longitudinal grooves and V-shaped grooves in their inner ends, the longitudinal grooves of one section being opposite the end grooves of the other section, collars having V-shaped grooves in their inner faces, and knives fitting in the longitudinal grooves and having pointed ends fitting in the end grooves of the adjacent section and in the grooves of one of the collars, substantially as described.

3. In a feed mill, the combination with a shaft having a screw threaded portion and provided with a fixed collar spaced from said screw threaded portion, of cylindrical sections secured to the shaft and each provided with longitudinal grooves and with V-shaped end grooves in its inner end, the longitudinal grooves of one section being opposite the end grooves of the other section, knives having pointed ends and fitting in the longitudinal grooves of the cylinder sections, loose collars on the shaft and having V-shaped grooves in their inner faces, and a nut on the shaft, substantially as herein shown and described.

JOHN O. SMITH.

Witnesses:
H. SNEBKUM,
J. F. MUNROE.